US010100239B2

(12) United States Patent
Nakamura et al.

(10) Patent No.: US 10,100,239 B2
(45) Date of Patent: Oct. 16, 2018

(54) ANTISTATIC AGENT, ANTISTATIC AGENT COMPOSITION, ANTISTATIC RESIN COMPOSITION, AND MOLDED BODY

(71) Applicant: ADEKA CORPORATION, Tokyo (JP)

(72) Inventors: Tatsuhito Nakamura, Saitama (JP); Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 213 days.

(21) Appl. No.: 14/760,570

(22) PCT Filed: Jan. 22, 2014

(86) PCT No.: PCT/JP2014/051203
§ 371 (c)(1),
(2) Date: Jul. 13, 2015

(87) PCT Pub. No.: WO2014/115745
PCT Pub. Date: Jul. 31, 2014

(65) Prior Publication Data
US 2015/0353796 A1 Dec. 10, 2015

(30) Foreign Application Priority Data

Jan. 23, 2013 (JP) ................. 2013-010555
Apr. 9, 2013 (JP) ................. 2013-081172

(51) Int. Cl.
C09K 3/16 (2006.01)
C08G 81/00 (2006.01)
C08G 63/91 (2006.01)
C08L 87/00 (2006.01)

(52) U.S. Cl.
CPC ............... C09K 3/16 (2013.01); C08G 63/91 (2013.01); C08G 81/00 (2013.01); C08L 87/005 (2013.01)

(58) Field of Classification Search
None
See application file for complete search history.

(56) References Cited

U.S. PATENT DOCUMENTS

| 3,548,026 A | 12/1970 | Weisfeld et al. |
| 6,099,757 A * | 8/2000 | Kulkarni ............... H01B 1/128 252/500 |
| 6,313,234 B1 | 11/2001 | Kaplan et al. |
| 6,552,131 B1 | 4/2003 | Higuchi et al. |
| 6,914,101 B2 * | 7/2005 | Sakane ................. C08G 63/20 524/706 |
| 2006/0281860 A1 | 12/2006 | Higuchi et al. |

FOREIGN PATENT DOCUMENTS

| EP | 1378540 A1 | 1/2004 |
| JP | 58-118838 A | 7/1983 |
| JP | 03-258850 A | 11/1991 |
| JP | 03-290464 A | 12/1991 |
| JP | 06-345927 A | 12/1994 |
| JP | 07-10989 A | 1/1995 |
| JP | 07309954 | * 11/1995 |
| JP | 11-269391 A | 10/1999 |
| JP | 2000-128584 | * 5/2000 |
| JP | 2001-278985 A | 10/2001 |
| JP | 2005-154728 A | 6/2005 |
| JP | 2006-28376 A | 2/2006 |
| JP | 2006-140413 A | 6/2006 |
| WO | WO 95/15572 A1 | 6/1995 |

OTHER PUBLICATIONS

International Search Report issued in PCT/JP2014/051203 dated Apr. 15, 2014.
Chinese Office Action and Search Report, dated Sep. 2, 2016, for Chinese Application No. 201480005912.6.
Extended European Search Report for European Application No. 14742864.3, dated Aug. 1, 2016.
Office Action dated Aug. 28, 2018 in Indian Patent Application No. 2068/MUMNP/2015 (with English Translation).

* cited by examiner

Primary Examiner — Tanisha Diggs
(74) Attorney, Agent, or Firm — Birch, Stewart, Kolasch & Birch, LLP

(57) ABSTRACT

Provided are: an antistatic agent which is capable of imparting excellent antistatic effect in a small amount and has sufficient persistence and wiping resistance; an antistatic agent composition; an antistatic resin composition; and a molded article. The antistatic agent comprises a polymer compound (E) having a structure in which a block polymer (C) and an epoxy compound (D) are bound via an ester bond formed by a carboxyl group of the block polymer (C) and an epoxy group of the epoxy compound (D), the block polymer (C) having a structure comprising carboxyl groups at both ends, in which structure a block constituted by a polyester (A) having carboxyl groups at both ends and a block constituted by a compound (B) having hydroxyl groups at both ends are repeatedly and alternately bound via ester bonds formed by the carboxyl groups and the hydroxyl groups, and the epoxy compound (D) comprising two or more epoxy groups.

10 Claims, No Drawings

ANTISTATIC AGENT, ANTISTATIC AGENT COMPOSITION, ANTISTATIC RESIN COMPOSITION, AND MOLDED BODY

TECHNICAL FIELD

The present invention relates to improvement of an antistatic agent, an antistatic agent composition, an antistatic resin composition (hereinafter, also simply referred to as "resin composition") and a molded article.

BACKGROUND ART

Thermoplastic resins are important materials that are indispensable in the modern world because they not only are light weight and easy to process but also have excellent properties in that, for example, their base materials can be designed in accordance with the intended use. In addition, thermoplastic resins have excellent electrical insulation properties; therefore, they are often utilized in the components and the like of electrical appliances. However, there is also a problem that thermoplastic resins are easily electrically charged by friction or the like because of excessively high insulation performance.

An electrically charged thermoplastic resin attracts dust and dirt in the surroundings and thus causes a problem of deteriorating the outer appearance of its molded article. Further, among electronic products, for example, in precision instruments such as computers, electric charge may interfere with normal operation of a circuit. Moreover, there are also problems that are caused by an electric shock. An electric shock to a person from a resin not only causes discomfort but also potentially induces accidental explosion in the presence of flammable gas or dust.

In order to resolve these problems, synthetic resins are conventionally subjected to an antistatic treatment. The most common antistatic treatment method is an addition of an antistatic agent to a synthetic resin of interest. Examples of the antistatic agent include coating-type antistatic agents that are coated on the surface of a resin molded article and kneading-type antistatic agents that are added when a resin is molded; however, the coating-type antistatic agents have poor persistence, and coating of a large amount of such an organic substance on a surface leads to a problem that objects coming into contact with the surface are contaminated.

From these perspectives, conventionally, kneading-type antistatic agents have mainly been examined and, for example, the use of polyether ester amide has been proposed for the purpose of imparting antistatic properties to polyolefin-based resins (Patent Documents 1 and 2). Furthermore, a block polymer having a structure in which a polyolefin block and a hydrophilic polymer block are repeatedly and alternately bound with each other has been proposed (Patent Document 3).

RELATED ART DOCUMENTS

Patent Documents

Patent Document 1: Japanese Unexamined Patent Application Publication No. S58-118838
Patent Document 2: Japanese Unexamined Patent Application Publication No. H3-290464
Patent Document 3: Japanese Unexamined Patent Application Publication No. 2001-278985

SUMMARY OF THE INVENTION

Problems to be Solved by the Invention

However, not only these conventional antistatic agents cannot demonstrate sufficient antistatic performance unless they are added in a large amount with respect to a resin, but also their antistatic effects are not persistent enough. Moreover, there is also a problem that wiping of the surface of a resin molded article causes a reduction in the antistatic effect.

In view of the above, an object of the present invention is to provide an antistatic agent which is capable of imparting excellent antistatic effect in a small amount and has sufficient persistence and wiping resistance. Another object of the present invention is to provide a thermoplastic resin composition having sufficient persistence and wiping resistance as well as excellent antistatic properties. Yet another object of the present invention is to provide a molded article composed of a thermoplastic resin, whose commercial value is not likely to be reduced by surface contamination or dust adhesion caused by static electricity.

Means for Solving the Problems

The present inventors intensively studied so as to solve the above-described problems, thereby completing the present invention.

That is, the antistatic agent of the present invention is characterized by comprising a polymer compound (E) having a structure in which a block polymer (C) and an epoxy compound (D) are bound via an ester bond formed by a carboxyl group of the block polymer (C) and an epoxy group of the epoxy compound (D), wherein the block polymer (C) has a structure comprising carboxyl groups at both ends, in which structure a block constituted by a polyester (A) having carboxyl groups at both ends and a block constituted by a compound (B) having hydroxyl groups at both ends are repeatedly and alternately bound via ester bonds formed by the carboxyl group and the hydroxyl group, and the epoxy compound (D) comprises two or more epoxy groups.

In the antistatic agent of the present invention, it is preferred that the polymer compound (E) further comprise an ester bond formed by a carboxyl group of the polyester (A) having carboxyl groups at both ends and an epoxy group of the epoxy compound (D). In the antistatic agent of the present invention, it is also preferred that the polyester (A) have a structure in which a residue obtained by removing a carboxyl group from an aliphatic dicarboxylic acid and a residue obtained by removing a hydroxyl group from a diol are repeatedly and alternately bound via ester bonds, and that the compound (B) having carboxyl groups at both ends comprise at least one group represented by the following Formula (1).

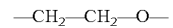  (1)

Further, in the antistatic agent of the present invention, it is preferred that the compound (B) having hydroxyl groups at both ends be a polyethylene glycol. Still further, in the antistatic agent of the present invention, it is preferred that the block constituted by the polyester (A) have a number-average molecular weight of 800 to 8,000 in terms of polystyrene, that the block constituted by the compound (B) having hydroxyl groups at both ends have a number-average molecular weight of 400 to 6,000 in terms of polystyrene, and that the block polymer (C) have a number-average molecular weight of 5,000 to 25,000 in terms of polystyrene.

The antistatic agent composition of the present invention is characterized by comprising at least one selected from the group consisting of alkali metal salts and Group II element salts in the antistatic agent of the present invention.

The antistatic resin composition of the present invention is characterized by comprising the antistatic agent of the present invention or the antistatic agent composition of the present invention in a thermoplastic resin.

In the antistatic resin composition of the present invention, it is preferred that the thermoplastic resin be at least one selected from the group consisting of polyolefin-based resins and polystyrene-based resins. In the antistatic resin composition of the present invention, it is also preferred that the mass ratio of the thermoplastic resin and the antistatic agent or the antistatic agent composition be in a range of 99/1 to 40/60.

The molded article of the present invention is characterized by being composed of the antistatic resin composition of the present invention.

Effects of the Invention

According to the present invention, an antistatic agent which is capable of imparting excellent antistatic effect in a small amount and has sufficient persistence and wiping resistance can be provided. In addition, according to the present invention, a thermoplastic resin composition having sufficient persistence and wiping resistance as well as excellent antistatic properties can be provided. Furthermore, according to the present invention, a molded article composed of a thermoplastic resin, whose commercial value is not likely to be reduced by surface contamination or dust adhesion caused by static electricity, can be provided.

MODE FOR CARRYING OUT THE INVENTION

Embodiments of the present invention will now be described in detail.

The polymer compound (E) of the present invention has a structure in which a block polymer (C) and an epoxy compound (D) are bound via an ester bond formed by a carboxyl group of the block polymer (C) and an epoxy group of the epoxy compound (D), the block polymer (C) having a structure comprising carboxyl groups at both ends, in which structure a block constituted by a polyester (A) having carboxyl groups at both ends and a block constituted by a compound (B) having hydroxyl groups at both ends are repeatedly and alternately bound via ester bonds formed by the carboxyl group and the hydroxyl group of each block, and the epoxy compound (D) comprising two or more epoxy groups.

First, the block of the polyester (A) having carboxyl groups at both ends, which constitutes the block polymer (C) having a structure comprising carboxyl groups at both ends, will be described. The polyester (A) may be any polyester as long as it has carboxyl groups at both ends; however, the polyester (A) preferably has a structure represented by the following Formula (2) in which a residue obtained by removing a carboxyl group from an aliphatic dicarboxylic acid and a residue obtained by removing a hydroxyl group from a diol are repeatedly and alternately bound via ester bonds.

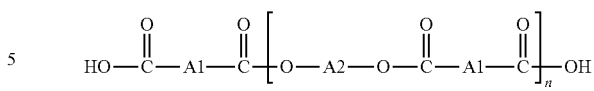

In the Formula (2), A1 represents a residue obtained by removing a carboxyl group from an aliphatic dicarboxylic acid; A2 represents a residue obtained by removing a hydroxyl group from a diol; and n represents a number of 1 to 50. The polyester having carboxyl groups at both ends that is represented by the Formula (2) can be obtained by, for example, polycondensation reaction of an aliphatic dicarboxylic acid and a diol.

The aliphatic dicarboxylic acid may be an aliphatic dicarboxylic acid derivative (e.g., an acid anhydride, an alkyl ester, an alkali metal salt or an acid halide). In cases where a polyester is obtained using a derivative, both ends of the resulting polyester can eventually be treated to be carboxyl groups, and the polyester may be subjected, as is, to the next reaction for obtaining the block polymer (C) having a structure comprising carboxyl groups at both ends. Further, two or more aliphatic dicarboxylic acids and derivatives thereof may be used in combination.

The aliphatic dicarboxylic acid is preferably, for example, an aliphatic dicarboxylic acid having 2 to 20 carbon atoms, and examples thereof include oxalic acid, malonic acid, succinic acid, glutaric acid, adipic acid, pimelic acid, suberic acid, azelaic acid, sebacic acid, 1,10-decanedicarboxylic acid, 1,4-cyclohexanedicarboxylic acid, dimer acid, maleic acid and fumaric acid. Among these dicarboxylic acids, from the standpoints of melting point and heat resistance, ones having 4 to 16 carbon atoms are preferred, and ones having 6 to 12 carbon atoms are more preferred.

Examples of the diol include aliphatic diols and aromatic group-containing diols. Two or more of these diols may be used in combination. Examples of the aliphatic diols include 1,2-ethanediol (ethylene glycol), 1,2-propanediol (propylene glycol), 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexane dimethanol, hydrogenated bisphenol A, 1,2-, 1,3- or 1,4-cyclohexanediol, cyclododecanediol, dimer diol, hydrogenated dimer diol, diethylene glycol, dipropylene glycol, triethylene glycol and polyethylene glycol. Among these aliphatic diols, 1,4-cyclohexane dimethanol and hydrogenated bisphenol A are preferred because of their compatibility with thermoplastic resins and antistatic properties.

The polyester having carboxyl groups at both ends that is represented by the Formula (2) is preferably hydrophobic; therefore, among aliphatic diols, hydrophilic polyethylene glycols are not preferred. This, however, does not apply to those cases where they are used in combination with other diol.

Examples of the aromatic group-containing diols include polyhydroxyethyl adducts of mononuclear dihydric phenol compounds, such as bisphenol A, 1,2-hydroxybenzene, 1,3-hydroxybenzene, 1,4-hydroxybenzene, 1,4-benzenedimethanol, bisphenol A-ethylene oxide adducts, bisphenol A-propylene oxide adducts, 1,4-bis(2-hydroxyethoxy)benzene, resorcin and pyrocatechol. Among these aromatic group-containing diols, bisphenol A-ethylene oxide adducts and 1,4-bis(β-hydroxyethoxy)benzene are preferred.

The polyester (A) having carboxyl groups at both ends can be obtained by, for example, allowing the above-described aliphatic dicarboxylic acid or derivative thereof and the above-described diol to undergo polycondensation reaction. As for the reaction ratio between the aliphatic dicarboxylic acid or derivative thereof and the diol, it is preferred that the aliphatic dicarboxylic acid or derivative thereof be used in an excess amount, particularly in an excess of 1 mol in terms of molar ratio with respect to the diol, such that the resulting polyester has carboxyl groups at both ends.

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed.

In cases where a derivative such as a carboxylic acid ester, metal carboxylate or carboxylic acid halide is used in place of the aliphatic dicarboxylic acid, after the derivative and the diol are allowed to react with each other, both ends of the resultant may be treated to be dicarboxylic acid, or the resultant may be directly subjected to a next reaction for obtaining the block polymer (C) having a structure comprising carboxyl groups at both ends.

The polyester (A) having carboxyl groups at both ends may be any polyester as long as it reacts with the component (B) to form an ester bond and thereby constitutes the structure of the block polymer (C). The carboxyl groups at both ends may be protected or modified, or may be in a precursor form. Further, in order to inhibit oxidation of the reaction product during the reaction, an antioxidant such as a phenolic antioxidant may also be added to the reaction system.

Next, the block of the compound (B) having hydroxyl groups at both ends, which constitutes the block polymer (C) having a structure comprising carboxyl groups at both ends, will be described.

The compound (B) having hydroxyl groups at both ends is preferably a hydrophilic compound, more preferably a compound comprising at least one group represented by the Formula (1), still more preferably a polyether comprising at least one group represented by the Formula (1), particularly preferably a polyethylene glycol represented by the following Formula (3).

   (3)

In the Formula (3), m represents a number of 5 to 250. From the standpoints of heat resistance and compatibility, m is preferably 20 to 150.

Examples of a compound having hydroxyl groups at both ends and at least one group represented by the Formula (1) include polyethylene glycols obtained by addition reaction of ethylene oxide; and polyethers obtained by addition reaction of ethylene oxide and at least one other alkylene oxide (e.g., propylene oxide, 1,2-, 1,4-, 2,3- or 1,3-butylene oxide), which may be random or block polyethers.

Examples of the compound having hydroxyl groups at both ends and at least one group represented by the Formula (1) also include compounds having a structure in which ethylene oxide is added to an active hydrogen atom-containing compound; and compounds having a structure in which ethylene oxide and at least one other alkylene oxide (e.g., propylene oxide, 1,2-, 1,4-, 2,3- or 1,3-butylene oxide) are added. The addition in these compounds may be random or block addition.

The active hydrogen atom-containing compound is, for example, a glycol, a dihydric phenol, a primary monoamine, a secondary diamine or a dicarboxylic acid.

As the glycol, for example, an aliphatic glycol having 2 to 20 carbon atoms, an alicyclic glycol having 5 to 12 carbon atoms or an aromatic glycol having 8 to 26 carbon atoms can be used.

Examples of the aliphatic glycol include ethylene glycol, 1,2-propylene glycol, 1,3-propanediol, 1,2-butanediol, 1,3-butanediol, 1,4-butanediol, 1,3-hexanediol, 1,4-hexanediol, 1,6-hexanediol, 2,5-hexanediol, 1,2-octanediol, 1,8-octanediol, 1,10-decanediol, 1,18-octadecanediol, 1,20-eicosanediol, diethylene glycol, triethylene glycol and thiodiethylene glycol.

Examples of the alicyclic glycol include 1-hydroxymethyl-1-cyclobutanol, 1,2-cyclohexanediol, 1,3-cyclohexanediol, 1,4-cyclohexanediol, 1-methyl-3,4-cyclohexanediol, 2-hydroxymethylcyclohexanol, 4-hydroxymethylcyclohexanol, 1,4-cyclohexane dimethanol and 1,1'-dihydroxy-1,1'-dicyclohexanol.

Examples of the aromatic glycol include dihydroxymethylbenzene, 1,4-bis(β-hydroxyethoxy)benzene, 2-phenyl-1,3-propanediol, 2-phenyl-1,4-butanediol, 2-benzyl-1,3-propanediol, triphenylethylene glycol, tetraphenylethylene glycol and benzopinacol.

As the dihydric phenol, a phenol having 6 to 30 carbon atoms can be used, and examples thereof include catechol, resorcinol, 1,4-dihydroxybenzene, hydroquinone, bisphenol A, bisphenol F, bisphenol S, dihydroxydiphenyl ether, dihydroxydiphenyl thioether, binaphthol, and alkyl (C1 to C10) or halogen substitution products of these phenols.

Examples of the primary monoamine include aliphatic primary monoamines having 1 to 20 carbon atoms, such as methylamine, ethylamine, n-propylamine, isopropylamine, n-butylamine, s-butylamine, isobutylamine, n-amylamine, isoamylamine, n-hexylamine, n-heptylamine, n-octylamine, n-decylamine, n-octadecylamine and n-eicosylamine.

As the secondary diamine, for example, an aliphatic secondary diamine having 4 to 18 carbon atoms, a heterocyclic secondary diamine having 4 to 13 carbon atoms, an alicyclic secondary diamine having 6 to 14 carbon atoms, an aromatic secondary diamine having 8 to 14 carbon atoms or a secondary alkanoldiamine having 3 to 22 carbon atoms can be used.

Examples of the aliphatic secondary diamine include N,N'-dimethylethylenediamine, N,N'-diethylethylenediamine, N,N'-dibutylethylenediamine, N,N'-dimethylpropylenediamine, N,N'-diethylpropylenediamine, N,N'-dibutylpropylenediamine, N,N'-dimethyltetramethylenediamine, N,N'-diethyltetramethylenediamine, N,N'-dibutyltetramethylenediamine, N,N'-dimethylhexamethylenediamine, N,N'-diethylhexamethylenediamine, N,N'-dibutylhexamethylenediamine, N,N'-dimethyldecamethylenediamine, N,N'-diethyldecamethylenediamine and N,N'-dibutyldecamethylenediamine.

Examples of the heterocyclic secondary diamine include piperazine and 1-aminopiperidine.

Examples of the alicyclic secondary diamine include N,N'-dimethyl-1,2-cyclobutanediamine, N,N-diethyl-1,2-cyclobutanediamine, N,N'-dibutyl-1,2-cyclobutanediamine, N,N'-dimethyl-1,4-cyclohexanediamine, N,N-diethyl-1,4-cyclohexanediamine, N,N-dibutyl-1,4-cyclohexanediamine, N,N'-dimethyl-1,3-cyclohexanediamine, N,N'-diethyl-1,3-cyclohexanediamine and N,N'-dibutyl-1,3-cyclohexanediamine.

Examples of the aromatic secondary diamine include N,N'-dimethyl-phenylenediamine, N,N'-dimethyl-xylylenediamine, N,N'-dimethyl-diphenylmethanediamine, N,N'-dimethyl-diphenyl ether diamine, N,N-dimethyl-benzidine and N,N-dimethyl-1,4-naphthalenediamine.

Examples of the secondary alkanoldiamine include N-methyldiethanolamine, N-octyldiethanolamine, N-stearyldiethanolamine and N-methyldipropanolamine.

As the dicarboxylic acid, a dicarboxylic acid having 2 to 20 carbon atoms, such as an aliphatic dicarboxylic acid, an aromatic dicarboxylic acid or an alicyclic dicarboxylic acid, can be used.

Examples of the aliphatic dicarboxylic acid include oxalic acid, malonic acid, succinic acid, glutaric acid, methylsuccinic acid, dimethylmalonic acid, β-methylglutaric acid, ethylsuccinic acid, isopropylmalonic acid, adipic acid, pimelic acid, suberic acid, azelaic acid, sebacic acid, undecanedioic acid, dodecanedioic acid, tridecanedioic acid, tetradecanedioic acid, hexadecanedioic acid, octadecanedioic acid and eicosanedioic acid.

Examples of the aromatic dicarboxylic acid include terephthalic acid, isophthalic acid, phthalic acid, phenylmalonic acid, homophthalic acid, phenylsuccinic acid, (3-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Examples of the alicyclic dicarboxylic acid include 1,3-cyclopentanedicarboxylic acid, 1,2-cyclopentanedicarboxylic acid, 1,4-cyclohexanedicarboxylic acid, 1,2-cyclohexanedicarboxylic acid, 1,3-cyclohexanedicarboxylic acid, 1,4-cyclohexanediacetic acid, 1,3-cyclohexanediacetic acid, 1,2-cyclohexanediacetic acid and dicyclohexyl-4,4'-dicarboxylic acid.

These active hydrogen atom-containing compounds may be used individually, or two or more thereof may be used in combination.

The compound (B) having hydroxyl groups at both ends may be any compound as long as it reacts with the component (A) to form an ester bond and thereby constitutes the structure of the block polymer (C). The hydroxyl groups at both ends may be protected or modified, or may be in a precursor form.

The block polymer (C) of the present invention having a structure comprising carboxyl groups at both ends contains the above-described block constituted by the polyester (A) and the above-described block constituted by the compound (B) and has a structure in which these blocks are repeatedly and alternately bound via ester bonds formed by the carboxyl groups and hydroxyl groups of the blocks. This block polymer (C) has a structure represented by the following Formula (4).

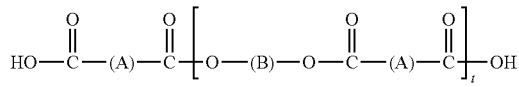

(4)

In the Formula (4), (A) represents the block constituted by the polyester (A) having carboxyl groups at both ends; (B) represents the block constituted by the compound (B) having hydroxyl groups at both ends; and t represents the number of repeating units, which is preferably 1 to 10, more preferably 1 to 7, most preferably 1 to 5.

The block polymer (C) having a structure comprising carboxyl groups at both ends can be obtained by allowing the polyester (A) having carboxyl groups at both ends and the compound (B) having hydroxyl groups at both ends to undergo polycondensation reaction; however, as long as the block polymer (C) has a structure that is equivalent to the one in which the polyester (A) and the compound (B) are repeatedly and alternately bound via ester bonds formed by carboxyl groups and hydroxyl groups, it is not necessarily required that the block polymer (C) be synthesized from the polyester (A) and the compound (B).

As for the reaction ratio between the polyester (A) and the compound (B), by adjusting the amount of the polyester (A) to be X+1 mol with respect to X mol of the compound (B), the block polymer (C) comprising carboxyl groups at both ends can be preferably obtained.

As for the reaction, after completion of the synthesis reaction of the polyester (A), without the thus synthesized polyester (A) being isolated, the compound (B) may be added to the reaction system and allowed to react with the polyester (A) as is.

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed. Further, in order to inhibit oxidation of the reaction product during the reaction, an antioxidant such as a phenolic antioxidant may also be added to the reaction system.

Next, the epoxy compound (D) will be described.

The epoxy compound (D) used in the present invention is not particularly restricted as long as it comprises two or more epoxy groups, and examples of such an epoxy compound include polyglycidyl ether compounds of mononuclear polyhydric phenol compounds, such as hydroquinone, resorcin, pyrocatechol and phloroglucinol; polyglycidyl ether compounds of polynuclear polyhydric phenol compounds such as dihydroxynaphthalene, biphenol, methylene bisphenol (bisphenol F), methylene bis(ortho-cresol), ethylidene bisphenol, isopropylidene bisphenol (bisphenol A), isopropylidene bis(ortho-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, o-cresol novolac, ethylphenol novolac, butylphenol novolac, octylphenol novolac, resorcin novolac and terpene phenol; polyglycidyl ethers of polyhydric alcohols, such as ethylene glycol, propylene glycol, butylene glycol, hexanediol, polyethylene glycol, polyglycol, thiodiglycol, glycerin, trimethylolpropane, pentaerythritol, sorbitol and bisphenol A-ethylene oxide adducts; homo- or co-polymers of glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid and endomethylene tetrahydrophthalic acid, and glycidyl methacrylate; glycidylamino group-containing epoxy compounds such as N,N-diglycidyl aniline, bis(4-(N-methyl-N-glycidylamino)phenyl)methane and diglycidyl ortho-toluidine; epoxidized cyclic olefin compounds such as vinylcyclohexene diepoxide, dicyclopentanediene diepoxide, 3,4-epoxycyclohexylmethyl-3,4-epoxycyclohexane carboxylate, 3,4-epoxy-6-methylcyclohexylmethyl-6-methylcyclohexane carboxylate and bis(3,4-epoxy-6-methylcyclohexylmethyl)adipate; epoxidized conjugated diene polymers such as epoxidized polybutadienes and epoxidized styrene-butadiene copolymers; heterocyclic compounds such as triglycidyl isocyanurate; and epoxidized soybean oil. These epoxy compounds may be internally cross-linked by a prepolymer having terminal isocyanate groups, or may be made to have a high molecular weight using a multivalent active hydrogen compound (e.g., a polyhydric phenol, a polyamine, a carbonyl group-containing compound or a polyphosphate). As the epoxy compound (D), two or more of these epoxy compounds may be used in combination.

The polymer compound (E) of the present invention has a structure in which the block polymer (C) having a structure comprising carboxyl groups at both ends and the epoxy compound (D) comprising two or more epoxy groups are bound via an ester bond formed by a terminal carboxyl group of the block polymer (C) and an epoxy group of the epoxy compound (D). The polymer compound (E) may further comprise an ester bond formed by a carboxyl group of the polyester (A) and an epoxy group of the epoxy compound (D).

In order to obtain the polymer compound (E), the carboxyl groups of the block polymer (C) and the epoxy groups of the epoxy compound (D) can be allowed to react with each other. The number of the epoxy groups of the epoxy compound (D) is preferably 0.5 to 5 equivalents, more preferably 0.5 to 1.5 equivalents, with respect to the number of the carboxyl groups of the block polymer (C) to be reacted. Further, the reaction can be performed in various solvents, or it may be performed in a molten state.

As for the reaction, after completion of the synthesis reaction of the block polymer (C), without the thus synthesized block polymer (C) being isolated, the epoxy compound (D) may be added to the reaction system and allowed to react with the block polymer (C) as is. In this case, unreacted carboxyl groups of the polyester (A) used in an excess amount in the synthesis of the block polymer (C) may react with some of the epoxy groups of the epoxy compound (D) to form ester bonds.

As long as the polymer compound (E) of the present invention has a structure that is equivalent to the one in which the block polymer (C) having a structure comprising carboxyl groups at both ends and the epoxy compound (D) comprising two or more epoxy groups are bound via ester bonds formed by their carboxyl groups and hydroxyl groups, it is not necessarily required that the polymer compound (E) be synthesized from the block polymer (C) and the epoxy compound (D).

In the polymer compound (E) of the present invention, the block constituted by the polyester (A) has a number-average molecular weight of preferably 800 to 8,000, more preferably 1,000 to 6,000, still more preferably 2,000 to 4,000, in terms of polystyrene. In the polymer compound (E), the block constituted by the compound (B) having hydroxyl groups at both ends has a number-average molecular weight of preferably 400 to 6,000, more preferably 1,000 to 5,000, still more preferably 2,000 to 4,000, in terms of polystyrene. Further, in the polymer compound (E), the block constituted by the block polymer (C) having a structure comprising carboxyl groups at both ends has a number-average molecular weight of preferably 5,000 to 25,000, more preferably 7,000 to 17,000, still more preferably 9,000 to 13,000, in terms of polystyrene.

It is also preferred that at least one selected from the group consisting of alkali metal salts and Group II element salts be further incorporated into the antistatic agent of the present invention to obtain an antistatic agent composition.

Examples of the alkali metal salts and Group II element salts include those of organic acids and inorganic acids. Examples of the alkali metal include lithium, sodium, potassium, cesium and rubidium, and examples of the Group II element include beryllium, magnesium, calcium, strontium and barium. Further, examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid, and examples of the inorganic acids include hydrochloric acid, hydrobromic acid, sulfuric acid, sulfurous acid, phosphoric acid, phosphorous acid, polyphosphoric acid, nitric acid and perchloric acid. Thereamong, from the standpoint of antistatic properties, alkali metal salts are preferred, salts of lithium, sodium and potassium are more preferred, and salts of lithium are most preferred. Further, from the standpoint of antistatic properties, acetates, perchlorates, p-toluenesulfonates and dodecylbenzenesulfonates are preferred.

Specific examples of the alkali metal salts and Group II element salts include lithium acetate, sodium acetate, potassium acetate, lithium chloride, sodium chloride, potassium chloride, magnesium chloride, calcium chloride, lithium phosphate, sodium phosphate, potassium phosphate, lithium sulfate, sodium sulfate, magnesium sulfate, calcium sulfate, lithium perchlorate, sodium perchlorate, potassium perchlorate, lithium p-toluenesulfonate, sodium p-toluenesulfonate, potassium p-toluenesulfonate, lithium dodecylbenzenesulfonate, sodium dodecylbenzenesulfonate and potassium dodecylbenzenesulfonate. Thereamong, for example, lithium acetate, potassium acetate, lithium p-toluenesulfonate, sodium p-toluenesulfonate and lithium chloride are preferred.

The above-described alkali metal salt(s) and/or Group II element salt(s) may be incorporated into the polymer compound (E) used in the antistatic agent of the present invention, or may be incorporated in a thermoplastic resin along with the polymer compound (E). The amount of the alkali metal salt(s) and/or Group II element salt(s) to be incorporated is preferably 0.01 to 20 parts by mass, more preferably 0.1 to 15 parts by mass, most preferably 1 to 10 parts by mass, with respect to 100 parts by mass of the polymer compound (E).

Further, a surfactant may also be incorporated into the antistatic agent of the present invention to use the resultant as an antistatic agent composition. As the surfactant, a nonionic, anionic, cationic or amphoteric surfactant can be employed. Examples of the nonionic surfactant include polyethylene glycol-type nonionic surfactants, such as higher alcohol ethylene oxide adducts, fatty acid ethylene oxide adducts, higher alkylamine ethylene oxide adducts and polypropylene glycol ethylene oxide adducts; and polyhydric alcohol-type nonionic surfactants, such as polyethylene oxides, glycerin fatty acid esters, pentaerythritol fatty acid esters, fatty acid esters of sorbitol and sorbitan, polyhydric alcohol alkyl ethers and alkanolamine aliphatic amides. Examples of the anionic surfactant include carboxylates such as alkali metal salts of higher fatty acids; sulfates such as higher alcohol sulfates and higher alkyl ether sulfates; sulfonates such as alkylbenzenesulfonates, alkylsulfonates and paraffin sulfonates; and phosphates such as higher alcohol phosphates, and examples of the cationic surfactant include quaternary ammonium salts such as alkyltrimethylammonium. Examples of the amphoteric surfactant include amino acid-type amphoteric surfactants such as higher alkylaminopropionates; and betaine-type amphoteric surfactants such as higher alkyldimethylbetaines and higher alkyldihydroxyethylbetaines. These surfactants may be used individually, or two or more thereof may be used in combination. In the present invention, among the above-described surfactants, anionic surfactants are preferred, and sulfonates such as alkylbenzenesulfonates, alkylsulfonates and paraffin sulfonates are particularly preferred.

The surfactant(s) may be incorporated into the polymer compound (E) used in the antistatic agent of the present invention, or may be incorporated in a thermoplastic resin along with the polymer compound (E). The amount of the surfactant(s) to be incorporated is preferably 0.01 to 20 parts by mass, more preferably 0.1 to 15 parts by mass, most preferably 1 to 10 parts by mass, with respect to 100 parts by mass of the polymer compound (E).

Further, a polymer-type antistatic agent may also be incorporated into the antistatic agent of the present invention to use the resultant as an antistatic agent composition. As the polymer-type antistatic agent, for example, a known polymer-type antistatic agent such as a polyether ester amide can be used, and examples thereof include the polyether ester amide disclosed in Japanese Unexamined Patent Application Publication No. H7-10989 which comprises a polyoxyalkylene adduct of bisphenol A. Further, a block polymer having 2 to 50 repeating structures composed of polyolefin blocks and hydrophilic polymer blocks can also be used, and examples thereof include the block polymer disclosed in U.S. Pat. No. 6,552,131 (Specification).

The polymer-type antistatic agent may be incorporated into the polymer compound (E) used in the antistatic agent of the present invention, or may be incorporated in a thermoplastic resin along with the polymer compound (E). The amount of the polymer-type antistatic agent to be incorporated is preferably 0 to 50 parts by mass, more preferably 5 to 20 parts by mass, with respect to 100 parts by mass of the polymer compound (E).

Still further, the antistatic agent of the present invention may be blended with an ionic liquid to use the resultant as an antistatic agent composition. The ionic liquid is, for example, a normal temperature-molten salt having a melting point of not higher than room temperature and an initial electrical conductivity of 1 to 200 ms/cm, preferably 10 to 200 ms/cm, in which at least one of the cation and anion constituting the ionic liquid is an organic ion. Examples of such a normal temperature-molten salt include the one disclosed in WO 97/15572.

The cation constituting the ionic liquid is, for example, one selected from the group consisting of amidinium, pyridinium, pyrazolium and guanidinium cations. Thereamong, examples of the amidinium cations include:
(1) imidazolinium cations
  those having 5 to 15 carbon atoms, such as 1,2,3,4-tetramethylimidazolinium and 1,3-dimethylimidazolinium;
(2) imidazolium cations
  those having 5 to 15 carbon atoms, such as 1,3-dimethylimidazolium and 1-ethyl-3-methylimidazolium;
(3) tetrahydropyrimidinium cations
  those having 6 to 15 carbon atoms, such as 1,3-dimethyl-1,4,5,6-tetrahydropyrimidinium and 1,2,3,4-tetramethyl-1,4,5,6-tetrahydropyrimidinium; and
(4) dihydropyrimidinium cations
  those having 6 to 20 carbon atoms, such as 1,3-dimethyl-1,4-dihydropyrimidinium, 1,3-dimethyl-1,6-dihydropyrimidinium, 8-methyl-1,8-diazabicyclo[5,4,0]-7,9-undecadienium and 8-methyl-1,8-diazabicyclo[5,4,0]-7,10-undecadienium.

Examples of the pyridinium cations include those having 6 to 20 carbon atoms, such as 3-methyl-1-propylpyridinium and 1-butyl-3,4-dimethylpyridinium. Examples of the pyrazolium cations include those having 5 to 15 carbon atoms, such as 1,2-dimethylpyrazolium and 1-n-butyl-2-methylpyrazolium. Examples of the guanidinium cations include:
(1) guanidinium cations having an imidazolinium skeleton
  those having 8 to 15 carbon atoms, such as 2-dimethylamino-1,3,4-trimethylimidazolinium and 2-diethylamino-1,3,4-trimethylimidazolinium;
(2) guanidinium cations having an imidazolium skeleton
  those having 8 to 15 carbon atoms, such as 2-dimethylamino-1,3,4-trimethylimidazolium and 2-diethylamino-1,3,4-trimethylimidazolium;
(3) guanidinium cations having a tetrahydropyrimidinium skeleton
  those having 10 to 20 carbon atoms, such as 2-dimethylamino-1,3,4-trimethyl-1,4,5,6-tetrahydropyrimidinium and 2-diethylamino-1,3-dimethyl-4-ethyl-1,4,5,6-tetrahydropyrimidinium; and
(4) guanidinium cations having a dihydropyrimidinium skeleton
  those having 10 to 20 carbon atoms, such as 2-dimethylamino-1,3,4-trimethyl-1,4-dihydropyrimidinium, 2-dimethylamino-1,3,4-trimethyl-1,6-dihydropyrimidinium, 2-diethylamino-1,3-dimethyl-4-ethyl-1,4-dihydropyrimidinium and 2-diethylamino-1,3-dimethyl-4-ethyl-1,6-dihydropyrimidinium.

The above-described cations may be used individually, or two or more thereof may be used in combination. Thereamong, from the standpoint of antistatic properties, amidinium cations are preferred, imidazolium cations are more preferred, and 1-ethyl-3-methylimidazolium cation is particularly preferred.

In the ionic liquid, examples of the organic or inorganic acid constituting the anion include the following ones. Examples of the organic acid include carboxylic acid, sulfuric acid ester, sulfonic acid and phosphoric acid ester, and examples of the inorganic acid include superacids (such as fluoroboric acid, tetrafluoroboric acid, perchloric acid, hexafluorophosphoric acid, hexafluoroantimonic acid and hexafluoroarsenic acid), phosphoric acid and boric acid. These organic and inorganic acids may be used individually, or two or more thereof may be used in combination.

Among these organic and inorganic acids, from the standpoint of the antistatic properties of the ionic liquid, acids forming a conjugate base of a super acid or an anion other than a conjugate base of a super acid, which allow the anion constituting the ionic acid to have a Hammett acidity function ($-H_0$) of 12 to 100, and mixtures of such acids are preferred.

Examples of the anion other than a conjugate base of a super acid include halogen (e.g., fluorine, chlorine, bromine) ions, alkyl (C1-12) benzenesulfonic acid (e.g., p-toluenesulfonic acid, dodecylbenzenesulfonic acid) ions, and poly (n=1 to 25) fluoroalkanesulfonic acid (e.g., undecafluoropentanesulfonic acid) ions.

Examples of the superacid include those derived from a protonic acid or a combination of a protonic acid and a Lewis acid, and mixtures thereof. Examples of the protonic acid used as the superacid include bis(trifluoromethylsulfonyl)imidic acid, bis(pentafluoroethylsulfonyl)imidic acid, tris(trifluoromethylsulfonyl)methane, perchloric acid, fluorosulfonic acid, alkane (C1 to C30) sulfonic acids (e.g., methanesulfonic acid and dodecanesulfonic acid), poly (n=1 to 30) fluoroalkane (C1 to C30) sulfonic acid (e.g., trifluoromethanesulfonic acid, pentafluoroethanesulfonic acid, heptafluoropropanesulfonic acid, nonafluorobutanesulfonic acid, undecafluoropentanesulfonic acid and tridecafluorohexanesulfonic acid), fluoroboric acid and tetrafluoroboric acid. Thereamong, from the standpoint of the ease of synthesis, fluoroboric acid, trifluoromethanesulfonic acid, bis (trifluoromethanesulfonyl)imidic acid and bis(pentafluoroethylsulfonyl)imidic acid are preferred.

Examples of the protonic acid used in combination with a Lewis acid include hydrogen halides (e.g., hydrogen fluoride, hydrogen chloride, hydrogen bromide and hydrogen iodide), perchloric acid, fluorosulfonic acid, methanesulfonic acid, trifluoromethanesulfonic acid, pentafluoroethanesulfonic acid, nonafluorobutanesulfonic acid, undecafluoropentanesulfonic acid, tridecafluorohexanesulfonic acid, and mixtures thereof. Thereamong, from the standpoint of the initial electrical conductivity of the ionic liquid, hydrogen fluoride is preferred.

Examples of the Lewis acid include boron trifluoride, phosphorus pentafluoride, antimony pentafluoride, arsenic pentafluoride, tantalum pentafluoride and mixtures thereof. Thereamong, from the standpoint of the initial electrical conductivity of the ionic liquid, boron trifluoride and phosphorus pentafluoride are preferred.

The combination of a protonic acid and a Lewis acid may be any combination, and examples of a superacid derived therefrom include tetrafluoroboric acid, hexafluorophosphoric acid, hexafluorotantalic acid, hexafluoroantimonic acid, hexafluorotantalic sulfonic acid, tetrafluoroboric acid, hexafluorophosphoric acid, chlorotrifluoroboric acid, hexafluoroarsenic acid, and mixtures thereof.

Among the above-described anions, from the standpoint of the antistatic properties of the ionic liquid, conjugate bases of superacids (superacids derived from a protonic acid and superacids derived from a combination of a protonic acid and a Lewis acid) are preferred, superacids derived from a protonic acid and conjugate bases of superacids derived from a protonic acid, boron trifluoride and/or phosphorus pentafluoride are more preferred.

Among the above-described ionic liquids, from the standpoint of the antistatic properties, amidinium cation-containing ionic liquids are preferred, 1-ethyl-3-methylimidazolium cation-containing ionic liquids are more preferred, and 1-ethyl-3-methylimidazoliumbis(trifluoromethanesulfonyl) imide is particularly preferred.

The amount of the ionic liquid to be blended is preferably 0.01 to 20 parts by mass, more preferably 0.1 to 15 parts by mass, most preferably 1 to 10 parts by mass, with respect to 100 parts by mass of the polymer compound (E).

Yet still further, a compatibilizer may also be incorporated into the antistatic agent of the present invention to use the resultant as an antistatic agent composition. By incorporating a compatibilizer, the compatibility of the antistatic agent component with other components and a thermoplastic resin can be improved. Examples of such a compatibilizer include modified vinyl polymers having at least one functional group (polar group) selected from the group consisting of a carboxyl group, an epoxy group, an amino group, a hydroxyl group and a polyoxyalkylene group, such as the polymer disclosed in Japanese Unexamined Patent Application Publication No. H3-258850, the sulfonyl group-containing modified vinyl polymer disclosed in Japanese Unexamined Patent Application Publication No. H6-345927 and block polymers comprising a polyolefin moiety and an aromatic vinyl polymer moiety.

The compatibilizer may be incorporated into the polymer compound (E) used in the antistatic agent of the present invention, or may be incorporated in a thermoplastic resin along with the polymer compound (E). The amount of the compatibilizer to be incorporated is preferably 0.1 to 15 parts by mass, more preferably 1 to 10 parts by mass, with respect to 100 parts by mass of the polymer compound (E).

The antistatic agent of the present invention and the antistatic agent composition of the present invention can each be particularly preferably incorporated into a thermoplastic resin to use the resultant as an antistatic resin composition. Examples of the thermoplastic resin include α-olefin polymers such as polypropylene, high-density polyethylene, low-density polyethylene, linear low-density polyethylene, cross-linked polyethylene, ultrahigh-molecular-weight polyethylene, polybutene-1, poly-3-methylpentene and poly-4-methylpentene; polyolefin-based resins and copolymers thereof, such as ethylene-vinyl acetate copolymers, ethylene-ethyl acrylate copolymers and ethylene-propylene copolymers; halogen-containing resins, such as polyvinyl chloride, polyvinyl idene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polystyrene; polyvinyl acetate; acrylic resins; copolymers (e.g., AS resins, ABS resins, ACS resins, SBS resins, MBS resins and heat-resistant ABS resins) composed of styrene and/or α-methylstyrene with other monomer (e.g., maleic anhydride, phenylmaleimide, methyl methacrylate, butadiene or acrylonitrile); polymethyl methacrylates; polyvinyl alcohols; polyvinyl formals; polyvinyl butyrals; aromatic polyesters including polyalkylene terephthalates, such as polyethylene terephthalate, polybutylene terephthalate and polycyclohexane dimethylene terephthalate, and polyalkylene naphthalates such as polyethylene naphthalate and polybutylene naphthalate, and linear polyesters such as polytetramethylene terephthalate; degradable aliphatic polyesters such as polyhydroxy butyrate, polycaprolactone, polybutylene succinate, polyethylene succinate, polylactic acid, polymalic acid, polyglycolic acid, polydioxane and poly(2-oxetanone); and thermoplastic resins and blends thereof, such as polyamides (e.g., polyphenylene oxide, polycaprolactam and polyhexamethylene adipamide), polycarbonates, polycarbonate/ABS resins, branched polycarbonates, polyacetals, polyphenylene sulfides, polyurethanes, cellulose-based resins, polyimide resins, polysulfones, polyphenylene ethers, polyether ketones, polyether ether ketones and liquid crystal polymers. Further, the thermoplastic resin may also be an elastomer, such as an isoprene rubber, a butadiene rubber, an acrylonitrile-butadiene copolymer rubber, a styrene-butadiene copolymer rubber, a fluorine rubber, a silicone rubber, an olefin-based elastomer, a styrene-based elastomer, a polyester-based elastomer, a nitrile-based elastomer, a nylon-based elastomer, a vinyl chloride-based elastomer, a polyamide-based elastomer or a polyurethane-based elastomer. In the present invention, these thermoplastic resins may be used individually, or two or more thereof may be used in combination. Further, these thermoplastic resin may be alloyed as well.

These thermoplastic resins can be used regardless of the molecular weight, polymerization degree, density, softening point, ratio of solvent-insoluble component(s), degree of stereoregularity, presence or absence of catalyst residue, type and blend ratio of each material monomer, type of polymerization catalyst (e.g., a Ziegler catalyst or a metallocene catalyst). Among the above-described thermoplastic resins, from the standpoint of antistatic properties, one or more selected from the group consisting of polyolefin-based resins, polystyrene-based resins and copolymers thereof are preferably used.

In the antistatic resin composition of the present invention, the mass ratio of the thermoplastic resin(s) and the antistatic agent or antistatic agent composition is preferably in a range of 99/1 to 40/60.

The method of incorporating the polymer compound (E) into the thermoplastic resin is not particularly restricted, and any commonly used method can be employed. For example, the polymer compound (E) can be mixed and kneaded into the thermoplastic resin by roll kneading or bumper kneading or using an extruder or a kneader. Further, the polymer compound (E) may be directly added to the thermoplastic resin; however, as required, the polymer compound (E) may be impregnated into a carrier before being added. In order to impregnate the polymer compound (E) into a carrier, the polymer compound (E) and the carrier can be directly heated and mixed, or a method in which the polymer compound (E) is diluted with an organic solvent before being impregnated into the carrier and the solvent is subsequently removed can be employed as required. As the carrier, one which is known as a filler or bulking agent of synthetic resins, or a flame retardant or light stabilizer that is solid at normal temperature can be employed, and examples of such a carrier include calcium silicate powder, silica powder, talc powder, alumina powder, titanium oxide powder, and these carriers having chemically modified surface, as well as the below-described flame retardants and antioxidants that are solid. Theramong, those carriers having chemically modified surfaces are preferred, and silica powder having chemically modified surface is more preferred. These carriers have an average particle size of preferably 0.1 to 100 μm, more preferably 0.5 to 50 μm.

As the method of incorporating the polymer compound (E) into a thermoplastic resin, the polymer compound (E) may be synthesized by kneading the block polymer (C) and the epoxy compound (D) simultaneously with the thermoplastic resin. Alternatively, the polymer compound (E) may be incorporated using a method of obtaining a molded article by mixing the polymer compound (E) and the thermoplastic resin at the time of molding such as injection molding, or a masterbatch of the polymer compound (E) and the thermoplastic resin, which has been produced in advance, may be incorporated.

To the antistatic resin composition of the present invention, as required, a variety of additives such as a phenolic antioxidant, a phosphorus-based antioxidant, a thioether-based antioxidant, an ultraviolet absorber and a hindered amine-based light stabilizer may also be added. By this, the resin composition of the present invention can be stabilized.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[3-(3,5-di-tert-butyl-4-hydroxyphenyl)propionic acid methyl] methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the thermoplastic resin.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis (4,6-di-tert-butylphenyl)fluorophosphite, tris(2-[(2,4,8,10-tetrakis-tert-butyldibenzo[d,f][1,3,2]dioxaphosphepin-6-yl) oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the thermoplastic resin.

Examples of the thioether-based antioxidant include dialkyl thiodipropionates such as di lauryl thiodipropionate, dimyristyl thiodipropionate and distearyl thiodipropionate; and pentaerythritol-tetra(β-alkylthiopropionic acid) esters. These thioether-based antioxidants are added in an amount of preferably 0.001 to 10 parts by mass, more preferably 0.05 to 5 parts by mass, with respect to 100 parts by mass of the thermoplastic resin.

Examples of the ultraviolet absorber include 2-hydroxybenzophenones such as 2,4-di hydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octyl phenyl)benzotriazole, 2-(2'-hydroxy-3',5'-dicumylphenyl)benzotriazole, 2,2'-methylene-bis(4-tert-octyl-6-(benzotriazolyl)phenol), 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the thermoplastic resin.

Examples of the hindered amine-based light stabilizer include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-tetramethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethylsuccinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane and 1,6,11-tris[2,4-bis(N-butyl-N-(1,2,2,6,6-pentamethyl-4-piperidyl)amino)-s-triazine-6-yl]aminoundecane. These hindered amine-based light stabilizers are added in an amount of preferably 0.001 to 30 parts by mass, more preferably 0.05 to 10 parts by mass, with respect to 100 parts by mass of the thermoplastic resin.

In cases where a polyolefin resin is used as the thermoplastic resin, in order to neutralize residual catalyst in the polyolefin resin, it is preferred to further add a known neutralizer as required. Examples of the neutralizer include fatty acid metal salts such as calcium stearate, lithium stearate and sodium stearate; and fatty acid amide compounds such as ethylene-bis(stearamide), ethylene-bis(12-hydroxystearamide) and stearic acid amide, and these neutralizers may be used in combination.

To the antistatic resin composition of the present invention, as required, for example, a nucleating agent (e.g., an aromatic metal carboxylate, an alicyclic metal alkylcarboxylate, aluminum p-tert-butylbenzoate, an aromatic metal phosphate or dibenzylidene sorbitols), a metallic soap, a hydrotalcite, a triazine ring-containing compound, a metal hydroxide, a phosphate-based flame retardant, a condensed phosphate-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, and/or a foaming agent, may be further added.

Examples of the triazine ring-containing compound include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine and 1,3-hexylene dimelamine.

Examples of the metal hydroxide include magnesium hydroxide, aluminum hydroxide, calcium hydroxide, barium hydroxide, zinc hydroxide and KISUMA 5A (magnesium hydroxide, manufactured by Kyowa Chemical Industry Co., Ltd.).

Examples of the phosphate-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl)phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenyl phosphate and tris(isopropylphenyl)phosphate.

Examples of the condensed phosphate-based flame retardant include 1,3-phenylene-bis(diphenylphosphate), 1,3-phenylene-bis(dixylenylphosphate) and bisphenol A-bis(diphenylphosphate).

Examples of the (poly)phosphate-based flame retardant include ammonium salts and amine salts of (poly)phosphoric acids, such as ammonium polyphosphate, melamine polyphosphate, piperazine polyphosphate, melamine pyrophosphate and piperazine pyrophosphate.

Examples of the above-described other inorganic flame retardant aid include inorganic compounds such as titanium oxide, aluminum oxide, magnesium oxide, hydrotalcites, talc and montmorillonite, and surface-treated products thereof. For example, a variety of commercially available products, such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by Kyowa Chemical Industry Co., Ltd.) and ALCAMIZER 4 (zinc-modified hydrotalcite: manufactured by Kyowa Chemical Industry Co., Ltd.), can be used. Examples of the above-described other organic flame retardant aid include pentaerythritol.

In addition, in the antistatic resin composition of the present invention, as required, an additive(s) normally used in synthetic resins, for example, a cross-linking agent, an anti-fogging agent, an anti-plate-out agent, a surface treatment agent, a plasticizer, a lubricant, a flame retardant, a fluorescent agent, an antifungal agent, an antibacterial agent, a foaming agent, a metal inactivator, a mold-release agent, a pigment, a processing aid, an antioxidant and/or a light stabilizer, may also be incorporated in such a range that does not impair the effects of the present invention.

The additives to be incorporated into the antistatic resin composition of the present invention may be directly added to a thermoplastic resin, or they may be incorporated into the antistatic agent or antistatic agent composition of the present invention, which may then be added to a thermoplastic resin.

An antistatic resin molded article can be obtained by molding the antistatic resin composition of the present invention. The molding method is not particularly restricted, and examples thereof include extrusion processing, calender processing, injection molding, rolling, compression molding, blow molding and rotational molding. Molded articles of various shapes, such as resin plates, sheets, films, bottles, fibers and special shape articles, can be produced by these methods. Such molded articles obtained from the antistatic resin composition of the present invention exhibit excellent antistatic performance with excellent persistence. Further, the molded articles also have wiping resistance.

The antistatic resin composition of the present invention and molded articles thereof can be used in a wide range of industrial fields, including the fields of electric/electronic communication, agriculture/forestry/fisheries, mining, construction, foods, fibers, clothings, health care, coal, petroleum, rubbers, leathers, automobiles, precision instruments, wood materials, building materials, civil engineering, furnitures, printing and musical instruments.

More specific examples of applications where the antistatic resin composition of the present invention and molded articles thereof can be used include office work automation equipments, such as printers, personal computers, word processors, keyboards, PDA (Personal Digital Assistant) devices, phones, copy machines, facsimiles, ECRs (electronic cash registers), electronic calculators, electronic organizers, cards, holders and stationeries; household electric appliances, such as laundry machines, refrigerators, vacuum cleaners, microwave ovens, lighting equipments, game machines, irons and kotatsu; audio and visual devices, such as televisions, video tape recorders, video cameras, radio-casette players, tape recorders, mini discs, CD players, speakers and liquid crystal displays; electric/electronic components and communication devices, such as connectors, relays, capacitors, switches, printed circuit boards, coil bobbins, semiconductor sealing materials, LED sealing materials, electric wires, cables, transformers, deflection yokes, distribution boards and clocks; automobile interior and exterior materials; platemaking films; adhesive films; bottles; food containers; food packaging films; pharmaceutical and medical wrapping films; product packaging films; agricultural films; agricultural sheets; and greenhouse films.

Furthermore, the antistatic resin composition of the present invention and molded articles thereof can also be used in other various applications, including materials of cars, vehicles, ships, airplanes, buildings and houses as well as construction and civil engineering materials, such as seats (e.g., stuffing, cover materials), belts, ceiling covers, convertible tops, armrests, door trims, rear package trays, carpets, mats, sun visors, wheel covers, mattress covers, airbags, insulating materials, straps, strap belts, wire coating materials, electric insulating materials, paints, coating materials, veneer materials, floor materials, baffle walls, carpets, wallpapers, wall decorating materials, exterior materials, interior materials, roof materials, deck materials, wall materials, pillar materials, floor boards, fence materials, framing and moulding materials, window and door-shaping materials, shingle boards, sidings, terraces, balconies, soundproof boards, heat insulating boards and window materials; and household articles and sporting goods, such as clothing materials, curtains, sheets, nonwoven fabrics, plywood boards, synthetic fiber boards, rugs, doormats, leisure sheets, buckets, hoses, containers, eye glasses, bags, casings, goggles, ski boards, rackets, tents and musical instruments.

EXAMPLES

The present invention will now be described more concretely by way of examples thereof. It is noted here that, in the below-described working examples and the like, "%" and "ppm" are all based on mass unless otherwise specified.

Antistatic agents were produced in accordance with the below-described Production Examples. Further, in the Production Examples, the number-average molecular weight was determined by the below-described method of measuring the molecular weight.

<Method of Measuring Molecular Weight>

The number-average molecular weight (hereinafter, referred to as "Mn") was measured by gel permeation chromatography (GPC). The conditions of the Mn measurement were as follows.

Apparatus: GPC apparatus, manufactured by JASCO Corporation
Solvent: tetrahydrofuran
Standard substance: polystyrene
Detector: differential refractometer (RI detector)
Column stationary phase: SHODEX KF-804L, manufactured by Showa Denko K.K.
Column temperature: 40° C.
Sample concentration: 1 mg/1 mL
Flow rate: 0.8 mL/min
Injection volume: 100 μL Production Example 1

To a separable flask, 420 g of 1,4-cyclohexane dimethanol, 485 g of adipic acid, 0.5 g of an antioxidant (tetrakis [3-(3,5-di-tert-butyl-4-hydroxyphenyl)propionyloxymethyl] methane: ADK STAB AO-60, manufactured by ADEKA Corporation) and 0.5 g of zirconium acetate were loaded. The loaded materials were allowed to polymerize for 4 hours under normal pressure with the temperature being slowly increased from 160° C. to 200° C. and then for 3 hours at 200° C. under reduced pressure, thereby obtaining a polyester (A)-1. This polyester (A)-1 had an acid value of 56 and a number-average molecular weight (Mn) of 3,200 in terms of polystyrene.

Next, 600 g of the thus obtained polyester (A)-1, 400 g of polyethylene glycol having a number-average molecular weight of 2,000 as a compound (B)-1 having hydroxyl groups at both ends, 0.5 g of an antioxidant (ADK STAB AO-60) and 0.5 g of zirconium acetate were loaded and allowed to polymerize at 200° C. for 7 hours under reduced pressure, thereby obtaining a block polymer (C)-1 having a structure comprising carboxyl groups at both ends. This block polymer (C)-1 had an acid value of 11 and a number-average molecular weight (Mn) of 10,000 in terms of polystyrene.

Then, 300 g of the thus obtained block polymer (C)-1 and 8.5 g of epoxidized soybean oil as an epoxy compound (D)-1 were loaded and allowed to polymerize at 240° C. for 3 hours under reduced pressure, thereby obtaining an antistatic agent (E)-1 according to the present invention.

Production Example 2

To a separable flask, 360 g of 1,4-bis(β-hydroxyethoxy)benzene, 310 g of adipic acid, 0.4 g of an antioxidant (ADK STAB AO-60) and 0.4 g of zirconium acetate were loaded. The loaded materials were allowed to polymerize for 4 hours under normal pressure with the temperature being slowly increased from 160° C. to 220° C. and then for 3 hours at 220° C. under reduced pressure, thereby obtaining a polyester (A)-2. This polyester (A)-2 had an acid value of 56 and a number-average molecular weight (Mn) of 2,500 in terms of polystyrene.

Next, 300 g of the thus obtained polyester (A)-2, 150 g of polyethylene glycol having a number-average molecular weight of 2,000 as a compound (B)-1 having hydroxyl groups at both ends, 0.5 g of an antioxidant (ADK STAB AO-60) and 0.5 g of zirconium acetate were loaded and allowed to polymerize at 200° C. for 9 hours under reduced pressure, thereby obtaining a block polymer (C)-2 having a structure comprising carboxyl groups at both ends. This block polymer (C)-2 had an acid value of 11 and a number-average molecular weight (Mn) of 10,000 in terms of polystyrene.

Then, 300 g of the thus obtained block polymer (C)-2 and 8.5 g of epoxidized soybean oil as an epoxy compound (D)-1 were loaded and allowed to polymerize at 240° C. for 3 hours under reduced pressure, thereby obtaining an antistatic agent (E)-2 according to the present invention.

Production Example 3

To a separable flask, 413 g of an ethylene oxide adduct of bisphenol A, 235 g of adipic acid, 0.5 g of an antioxidant (ADK STAB AO-60) and 0.5 g of zirconium acetate were loaded. The loaded materials were allowed to polymerize for 4 hours under normal pressure with the temperature being slowly increased from 160° C. to 200° C. and then for 5 hours at 200° C. under reduced pressure, thereby obtaining a polyester (A)-3. This polyester (A)-3 had an acid value of 56 and a number-average molecular weight (Mn) of 2,100 in terms of polystyrene.

Next, 300 g of the thus obtained polyester (A)-3, 150 g of polyethylene glycol having a number-average molecular weight of 2,000 as a compound (B)-1 having hydroxyl groups at both ends, 0.5 g of an antioxidant (ADK STAB AO-60) and 0.5 g of zirconium acetate were loaded and allowed to polymerize at 200° C. for 7 hours under reduced pressure, thereby obtaining a block polymer (C)-3 having a structure comprising carboxyl groups at both ends. This block polymer (C)-3 had an acid value of 11 and a number-average molecular weight (Mn) of 10,500 in terms of polystyrene.

Then, 300 g of the thus obtained block polymer (C)-3 and 8.5 g of epoxidized soybean oil as an epoxy compound (D)-1 were loaded and allowed to polymerize at 240° C. for 3 hours under reduced pressure, thereby obtaining an antistatic agent (E)-3 according to the present invention.

Production Example 4

To a separable flask, 382 g of hydrogenated bisphenol A, 276 g of adipic acid, 0.4 g of an antioxidant (ADK STAB AO-60) and 0.4 g of zirconium acetate were loaded. The loaded materials were allowed to polymerize for 4 hours under normal pressure with the temperature being slowly increased from 160° C. to 200° C. and then for 4 hours at 200° C. under reduced pressure, thereby obtaining a polyester (A)-4. This polyester (A)-4 had an acid value of 56 and a number-average molecular weight (Mn) of 2,900 in terms of polystyrene.

Next, 300 g of the thus obtained polyester (A)-4, 150 g of polyethylene glycol having a number-average molecular weight of 2,000 as a compound (B)-1 having hydroxyl groups at both ends, 0.5 g of an antioxidant (ADK STAB AO-60) and 0.5 g of zirconium acetate were loaded and allowed to polymerize at 200° C. for 5 hours under reduced pressure, thereby obtaining a block polymer (C)-4 having a structure comprising carboxyl groups at both ends. This block polymer (C)-4 had an acid value of 11 and a number-average molecular weight (Mn) of 9,300 in terms of polystyrene.

Then, 300 g of the thus obtained block polymer (C)-4 and 8.5 g of epoxidized soybean oil as an epoxy compound (D)-1 were loaded and allowed to polymerize at 240° C. for 2 hours under reduced pressure, thereby obtaining an antistatic agent (E)-4 according to the present invention.

Production Example 5

To a separable flask, 300 g of the block polymer (C)-1 obtained by the method described in Production Example 1 and 12 g of an o-cresol novolac-type epoxy resin as an epoxy compound (D)-2 were loaded, and these loaded materials were allowed to polymerize at 240° C. for 3 hours under reduced pressure, thereby obtaining an antistatic agent (E)-5 according to the present invention.

Production Example 6

To a separable flask, 300 g of the block polymer (C)-1 obtained by the method described in Production Example 1 and 12 g of a partially epoxidized polybutadiene as an epoxy compound (D)-3 were loaded, and these loaded materials were allowed to polymerize at 200° C. for 6 hours under reduced pressure, thereby obtaining an antistatic agent (E)-6 according to the present invention.

Production Example 7

To a separable flask, 188 g of 1,4-cyclohexane dimethanol, 259 g of 1,4-cyclohexanedicarboxylic acid, 0.3 g of an antioxidant (ADK STAB AO-60) and 0.3 g of zinc acetate were loaded. The loaded materials were allowed to polymerize for 4 hours under normal pressure with the temperature being slowly increased from 160° C. to 200° C. and then for 5 hours at 200° C. under reduced pressure, thereby obtaining a polyester (A)-5. This polyester (A)-5 had an acid value of 56 and a number-average molecular weight (Mn) of 3,200 in terms of polystyrene.

Next, 300 g of the thus obtained polyester (A)-5, 150 g of polyethylene glycol having a number-average molecular weight of 2,000 as a compound (B)-1 having hydroxyl groups at both ends, 0.5 g of an antioxidant (ADK STAB AO-60) and 0.5 g of zinc acetate were loaded and allowed to polymerize at 200° C. for 7 hours under reduced pressure, thereby obtaining a block polymer (C)-5 having a structure comprising carboxyl groups at both ends. This block polymer (C)-5 had an acid value of 11 and a number-average molecular weight (Mn) of 11,000 in terms of polystyrene.

Then, 300 g of the thus obtained block polymer (C)-5 and 11 g of bisphenol F diglycidyl ether as an epoxy compound (D)-4 were loaded and allowed to polymerize at 240° C. for 3 hours under reduced pressure, thereby obtaining an antistatic agent (E)-7 according to the present invention.

Production Example 8

To a separable flask, 300 g of the block polymer (C)-5 obtained by the method described in Production Example 7 and 11 g of dicyclopentadiene methanol diglycidyl ether as an epoxy compound (D)-5 were loaded, and these loaded materials were allowed to polymerize at 240° C. for 3 hours under reduced pressure, thereby obtaining an antistatic agent (E)-8 according to the present invention.

Production Example 9

To a separable flask, 394 g of 1,4-cyclohexane dimethanol, 405 g of succinic acid, 0.6 g of an antioxidant (ADK STAB AO-60) and 0.6 g of zirconium acetate were loaded. The loaded materials were allowed to polymerize for 4 hours under normal pressure with the temperature being slowly increased from 160° C. to 200° C. and then for 6 hours at 200° C. under reduced pressure, thereby obtaining a polyester (A)-6. This polyester (A)-6 had an acid value of 112 and a number-average molecular weight (Mn) of 1,600 in terms of polystyrene.

Next, 300 g of the thus obtained polyester (A)-6, 200 g of polyethylene glycol having a number-average molecular weight of 1,000 as a compound (B)-2 having hydroxyl groups at both ends, 0.5 g of an antioxidant (ADK STAB AO-60) and 0.5 g of zirconium acetate were loaded and allowed to polymerize at 200° C. for 7 hours under reduced pressure, thereby obtaining a block polymer (C)-6 having a structure comprising carboxyl groups at both ends. This block polymer (C)-6 had an acid value of 22 and a number-average molecular weight (Mn) of 5,200 in terms of polystyrene.

Then, 300 g of the thus obtained block polymer (C)-6 and 19 g of hydrogenated bisphenol A diglycidyl ether as an epoxy compound (D)-6 were loaded and allowed to polymerize at 240° C. for 3 hours under reduced pressure, thereby obtaining an antistatic agent (E)-9 according to the present invention.

Production Example 10

To a separable flask, 461 g of hydrogenated bisphenol A, 309 g of succinic acid, 0.4 g of an antioxidant (ADK STAB AO-60) and 0.4 g of zirconium acetate were loaded. The loaded materials were allowed to polymerize for 4 hours under normal pressure with the temperature being slowly increased from 160° C. to 200° C. and then for 4 hours at 200° C. under reduced pressure, thereby obtaining a polyester (A)-7. This polyester (A)-7 had an acid value of 112 and a number-average molecular weight (Mn) of 1,700 in terms of polystyrene.

Next, 300 g of the thus obtained polyester (A)-7, 240 g of polyethylene glycol having a number-average molecular weight of 1,000 as a compound (B)-2 having hydroxyl groups at both ends, 0.5 g of an antioxidant (ADK STAB AO-60) and 0.5 g of zirconium acetate were loaded and allowed to polymerize at 200° C. for 6 hours under reduced pressure, thereby obtaining a block polymer (C)-7 having a structure comprising carboxyl groups at both ends. This block polymer (C)-7 had an acid value of 13 and a number-average molecular weight (Mn) of 8,200 in terms of polystyrene.

Then, 300 g of the thus obtained block polymer (C)-7 and 16 g of epoxidized soybean oil as an epoxy compound (D)-1 were loaded and allowed to polymerize at 240° C. for 3 hours under reduced pressure, thereby obtaining an antistatic agent (E)-10 according to the present invention.

Production Example 11

To a separable flask, 479 g of 1,4-cyclohexane dimethanol, 439 g of succinic acid, 0.6 g of an antioxidant (ADK STAB AO-60) and 0.6 g of zirconium acetate were loaded. The loaded materials were allowed to polymerize for 4 hours under normal pressure with the temperature being slowly increased from 160° C. to 200° C. and then for 4 hours at 200° C. under reduced pressure, thereby obtaining a polyester (A)-8. This polyester (A)-8 had an acid value of 56 and a number-average molecular weight (Mn) of 3,100 in terms of polystyrene.

Next, 300 g of the thus obtained polyester (A)-8, 150 g of polyethylene glycol having a number-average molecular weight of 2,000 as a compound (B)-1 having hydroxyl groups at both ends, 0.5 g of an antioxidant (ADK STAB AO-60) and 0.5 g of zirconium acetate were loaded and allowed to polymerize at 200° C. for 5 hours under reduced pressure, thereby obtaining a block polymer (C)-8 having a structure comprising carboxyl groups at both ends. This block polymer (C)-8 had an acid value of 19 and a number-average molecular weight (Mn) of 7,300 in terms of polystyrene.

Then, 300 g of the thus obtained block polymer (C)-8 and 24 g of epoxidized soybean oil as an epoxy compound (D)-1 were loaded and allowed to polymerize at 240° C. for 3 hours under reduced pressure, thereby obtaining an antistatic agent (E)-11 according to the present invention.

Production Example 12

To a separable flask, 297 g of 1,4-bis(β-hydroxyethoxy)benzene, 364 g of sebacic acid, 0.5 g of an antioxidant (ADK STAB AO-60) and 0.5 g of zirconium acetate were loaded. The loaded materials were allowed to polymerize for 5 hours under normal pressure with the temperature being slowly increased from 160° C. to 200° C. and then for 4 hours at 220° C. under reduced pressure, thereby obtaining a polyester (A)-9. This polyester (A)-9 had an acid value of 56 and a number-average molecular weight (Mn) of 2,100 in terms of polystyrene.

Next, 400 g of the thus obtained polyester (A)-9, 300 g of polyethylene glycol having a number-average molecular weight of 2,000 as a compound (B)-1 having hydroxyl groups at both ends, 0.5 g of an antioxidant (ADK STAB AO-60) and 0.5 g of zirconium acetate were loaded and allowed to polymerize at 200° C. for 8 hours under reduced pressure, thereby obtaining a block polymer (C)-9 having a structure comprising carboxyl groups at both ends. This block polymer (C)-9 had an acid value of 8 and a number-average molecular weight (Mn) of 14,000 in terms of polystyrene.

Then, 300 g of the thus obtained block polymer (C)-9 and 11 g of epoxidized soybean oil as an epoxy compound (D)-1 were loaded and allowed to polymerize at 240° C. for 3 hours under reduced pressure, thereby obtaining an antistatic agent (E)-12 according to the present invention.

Production Example 13

To a separable flask, 354 g of 1,4-cyclohexane dimethanol, 538 g of sebacic acid, 0.6 g of an antioxidant (ADK STAB AO-60) and 0.6 g of zirconium acetate were loaded. The loaded materials were allowed to polymerize for 4 hours under normal pressure with the temperature being slowly increased from 160° C. to 200° C. and then for 4 hours at 200° C. under reduced pressure, thereby obtaining a polyester (A)-10. This polyester (A)-10 had an acid value of 28 and a number-average molecular weight (Mn) of 5,200 in terms of polystyrene.

Next, 400 g of the thus obtained polyester (A)-10, 200 g of polyethylene glycol having a number-average molecular weight of 4,000 as a compound (B)-3 having hydroxyl groups at both ends, 0.5 g of an antioxidant (ADK STAB AO-60) and 0.5 g of zirconium acetate were loaded and allowed to polymerize at 200° C. for 8 hours under reduced pressure, thereby obtaining a block polymer (C)-10 having a structure comprising carboxyl groups at both ends. This block polymer (C)-10 had an acid value of 9 and a number-average molecular weight (Mn) of 13,000 in terms of polystyrene.

Then, 300 g of the thus obtained block polymer (C)-10 and 12 g of epoxidized soybean oil as an epoxy compound (D)-1 were loaded and allowed to polymerize at 240° C. for 3 hours under reduced pressure, thereby obtaining an antistatic agent (E)-13 according to the present invention.

Production Example 14

To a separable flask, 300 g of the polyester (A)-10 obtained by the method described in Production Example 13, 200 g of polyethylene glycol having a number-average molecular weight of 4,000 as a compound (B)-3 having hydroxyl groups at both ends, 0.5 g of an antioxidant (ADK STAB AO-60) and 0.5 g of zirconium acetate were loaded. The loaded materials were allowed to polymerize for 6 hours at 220° C. under reduced pressure, thereby obtaining a block polymer (C)-11 having a structure comprising carboxyl groups at both ends. This block polymer (C)-11 had an acid value of 5.6 and a number-average molecular weight (Mn) of 18,000 in terms of polystyrene.

Then, 300 g of the thus obtained block polymer (C)-11 and 7 g of epoxidized soybean oil as an epoxy compound (D)-1 were loaded and allowed to polymerize at 240° C. for 2 hours under reduced pressure, thereby obtaining an antistatic agent (E)-14 according to the present invention.

Production Example 15

To a separable flask, 323 g of 1,4-cyclohexane dimethanol, 478 g of sebacic acid, 0.6 g of an antioxidant (ADK STAB AO-60) and 0.6 g of zirconium acetate were loaded. The loaded materials were allowed to polymerize for 4 hours under normal pressure with the temperature being slowly increased from 160° C. to 200° C. and then for 4 hours at 200° C. under reduced pressure, thereby obtaining a polyester (A)-11. This polyester (A)-11 had an acid value of 19 and a number-average molecular weight (Mn) of 6,900 in terms of polystyrene.

Next, 400 g of the thus obtained polyester (A)-11, 200 g of polyethylene glycol having a number-average molecular weight of 6,000 as a compound (B)-4 having hydroxyl groups at both ends, 0.5 g of an antioxidant (ADK STAB AO-60) and 0.5 g of zirconium acetate were loaded and allowed to polymerize at 200° C. for 8 hours under reduced pressure, thereby obtaining a block polymer (C)-12 having a structure comprising carboxyl groups at both ends. This block polymer (C)-12 had an acid value of 6.2 and a number-average molecular weight (Mn) of 17,500 in terms of polystyrene.

Then, 300 g of the thus obtained block polymer (C)-12 and 6 g of bisphenol A diglycidyl ether as an epoxy compound (D)-7 were loaded and allowed to polymerize at 240° C. for 3 hours under reduced pressure, thereby obtaining an antistatic agent (E)-15 according to the present invention.

Comparative Production Example 1

The block polymer (C)-1 having a structure comprising carboxyl groups at both ends was synthesized by the method described in Production Example 1. The thus obtained block polymer (C)-1 was used as a comparative antistatic agent (1) in a Comparative Example.

Comparative Production Example 2

To a separable flask, 328 g of 1,4-cyclohexane dimethanol, 354 g of adipic acid, 0.5 g of an antioxidant (ADK STAB AO-60) and 0.5 g of zirconium acetate were loaded. The loaded materials were allowed to polymerize for 4 hours under normal pressure with the temperature being slowly increased from 160° C. to 200° C. and then for 3 hours at 200° C. under reduced pressure, thereby obtaining a comparative polyester-1. This comparative polyester-1 had an acid value of 28 and a number-average molecular weight (Mn) of 5,300 in terms of polystyrene.

Then, 400 g of the comparative polyester-1, 200 g of polyethylene glycol having a number-average molecular weight of 4,000, 0.5 g of an antioxidant (ADK STAB AO-60) and 0.5 g of zirconium acetate were loaded and allowed to polymerize at 200° C. for 7 hours under reduced pressure, thereby obtaining a comparative polyether ester-1 comprising carboxyl groups at both ends. The thus obtained comparative polyether ester-1 had an acid value of 9 and a number-average molecular weight (Mn) of 12,200 in terms of polystyrene. This comparative polyether ester-1 was used as a comparative antistatic agent (2) in a Comparative Example.

Comparative Production Example 3

To a separable flask, 300 g of the polyester (A)-1 obtained by the method described in Production Example 1, 300 g of polyethylene glycol having a number-average molecular weight of 2,000, 0.5 g of an antioxidant (ADK STAB AO-60) and 0.5 g of zirconium acetate were loaded. The loaded materials were allowed to polymerize for 8 hours at 200° C. under reduced pressure, thereby obtaining a comparative polyether ester-2 comprising a hydroxyl group at one end. The thus obtained comparative polyether ester-2 had an acid value of 5.6 and a number-average molecular weight (Mn) of 10,200 in terms of polystyrene. This comparative polyether ester-2 was used as a comparative antistatic agent (3) in a Comparative Example.

Comparative Production Example 4

To a separable flask, 300 g of the comparative polyether ester-2 comprising a hydroxyl group at one end, which was obtained by the method described in Comparative Production Example 3, and 7 g of epoxidized soybean oil were loaded, and these materials were allowed to polymerize at 240° C. for 3 hours under reduced pressure, thereby obtaining a comparative antistatic agent (4). The thus obtained comparative antistatic agent (4) was used in a Comparative Example.

Comparative Production Example 5

To a separable flask, 400 g of the polyester (A)-1 obtained by the method described in Production Example 1, 600 g of polyethylene glycol having a number-average molecular weight of 2,000, 0.6 g of an antioxidant (ADK STAB AO-60) and 0.6 g of zirconium acetate were loaded. The loaded materials were allowed to polymerize for 5 hours at 200° C. under reduced pressure, thereby obtaining a comparative polyether ester-3 comprising hydroxyl groups at both ends. The thus obtained comparative polyether ester-3 had a hydroxyl value of 11 and a number-average molecular weight (Mn) of 10,000 in terms of polystyrene.

Then, 300 g of the comparative polyether ester-3 and 14 g of epoxidized soybean oil were loaded and allowed to polymerize at 240° C. for 3 hours under reduced pressure, thereby obtaining a comparative antistatic agent (5). The thus obtained comparative antistatic agent (5) was used in a Comparative Example.

Comparative Production Example 6

To a separable flask, 300 g of the polyester (A)-1 obtained by the method described in Production Example 1, 16 g of 2-hexadecyloxirane were loaded, and these materials were allowed to polymerize at 200° C. for 6 hours under reduced pressure, thereby obtaining a comparative antistatic agent (6). This comparative antistatic agent (6), which had a hydroxyl value of 11 and a number-average molecular weight (Mn) of 10,500 in terms of polystyrene, was used in a Comparative Example.

Examples 1 to 27, Comparative Examples 1 to 8

Using antistatic resin compositions that were blended based on the respective amounts shown in Tables 1 to 4 below, test pieces thereof were obtained in accordance with the below-described conditions of test piece preparation. For each of the thus obtained test pieces, the surface specific resistance (SR value) was measured and a test for evaluation of resistance to wiping with water was conducted. In the same manner, the resin compositions of Comparative Examples were prepared in accordance with the respective formulations shown in Table 5 below and each subjected to the evaluations.

<Conditions for Preparing Test Pieces of Impact Copolymer Polypropylene Resin Compositions>

Using a biaxial extruder manufactured by Ikegai Corp. (PCM30, equipped with a 60-mesh screen), antistatic resin compositions that were blended based on the respective amounts shown in Tables below were each granulated under the conditions of 200° C. and 6 kg/hr to obtain a pellet. Then, using a horizontal injection molding machine (NEX80, manufactured by Nissei Plastic Industrial Co., Ltd.), the thus obtained pellet was molded at a resin temperature of 200° C. and a die temperature of 40° C. to obtain a test piece of 100 mm×100 mm×3 mm in size.

<Conditions for Preparing Test Pieces of Homopolypropylene Resin Compositions>

Using a biaxial extruder manufactured by Ikegai Corp. (PCM30, equipped with a 60-mesh screen), antistatic resin compositions that were blended based on the respective amounts shown in Tables below were each granulated under the conditions of 230° C. and 6 kg/hr to obtain a pellet. Then, using a horizontal injection molding machine (NEX80, manufactured by Nissei Plastic Industrial Co., Ltd.), the thus obtained pellet was molded at a resin temperature of 230° C. and a die temperature of 40° C. to obtain a test piece of 100 mm×100 mm×3 mm in size.

<Conditions for Preparing Test Pieces of ABS Resin Compositions>

Using a biaxial extruder manufactured by Ikegai Corp. (PCM30, equipped with a 60-mesh screen), antistatic resin compositions that were blended based on the respective amounts shown in Tables below were each granulated under the conditions of 230° C. and 6 kg/hr to obtain a pellet. Then, using a horizontal injection molding machine (NEX80, manufactured by Nissei Plastic Industrial Co., Ltd.), the thus obtained pellet was molded at a resin temperature of 230° C. and a die temperature of 50° C. to obtain a test piece of 100 mm×100 mm×3 mm in size.

<Method of Measuring Surface Specific Resistance (SR Value)>

The thus obtained test pieces were each molded and, immediately thereafter, stored under the conditions of a temperature of 25° C. and a humidity of 60% RH. After 1 day and 30 days of storage, under the same atmosphere, the surface specific resistance (Ω/□) of each molded test piece was measured using an R8340 resistance meter manufactured by Advantest Corporation under the conditions of an applied voltage of 100 V and an application time of 1 minute. The measurement was performed at five spots and an average thereof was determined.

<Test for Evaluation of Resistance to Wiping with Water>

The surface of each of the thus obtained test pieces was wiped with a waste cloth 50 times in running water and subsequently stored for 2 hours under the conditions of a temperature of 25° C. and a humidity of 60%. Thereafter, under the same atmosphere, the surface specific resistance (Ω/□) was measured using an R8340 resistance meter manufactured by Advantest Corporation under the conditions of an applied voltage of 100 V and an application time of 1 minute. The measurement was performed at five spots and an average thereof was determined.

TABLE 1

| Example | | 1 | 2 | 3 | 4 | 5 | 6 | 7 |
|---|---|---|---|---|---|---|---|---|
| Antistatic agent | (E)-1 | 10 | 10 | 10 | 10 | 10 | — | — |
| | (E)-2 | — | — | — | — | — | 10 | — |
| | (E)-3 | — | — | — | — | — | — | 10 |
| Alkali metal salt | KOAc*1 | — | 0.5 | — | — | — | — | — |
| | NaDBS*2 | — | — | 0.5 | — | — | — | — |
| | LiOTs*3 | — | — | — | 0.5 | — | 0.5 | 0.5 |

TABLE 1-continued

| Example | | 1 | 2 | 3 | 4 | 5 | 6 | 7 |
|---|---|---|---|---|---|---|---|---|
| Ionic liquid | IBTFS*4 | — | — | — | — | 0.5 | — | — |
| Thermoplastic resin | ICP*5 | 100 | 100 | 100 | 100 | 100 | 100 | 100 |
| | hPP*6 | — | — | — | — | — | — | — |
| | ABS*7 | — | — | — | — | — | — | — |
| Surface specific resistance ($\Omega/\square$) | After 1 day | $5 \times 10^{12}$ | $1 \times 10^{11}$ | $9 \times 10^{11}$ | $2 \times 10^{11}$ | $3 \times 10^{10}$ | $4 \times 10^{11}$ | $5 \times 10^{11}$ |
| | After 30 days | $5 \times 10^{12}$ | $1 \times 10^{11}$ | $9 \times 10^{11}$ | $3 \times 10^{11}$ | $1 \times 10^{10}$ | $3 \times 10^{11}$ | $3 \times 10^{11}$ |
| | Evaluation of resistance to wiping with water | $4 \times 10^{12}$ | $9 \times 10^{10}$ | $9 \times 10^{11}$ | $2 \times 10^{11}$ | $2 \times 10^{10}$ | $3 \times 10^{11}$ | $4 \times 10^{11}$ |

*1: potassium acetate
*2: sodium dodecylbenzenesulfonate
*3: lithium p-toluenesulfonate
*4: 1-ethyl-3-methylimidazolium-bis(trifluoromethanesulfonyl)imide
*5: impact copolymer polypropylene; trade name BC03B, manufactured by Japan Polypropylene Corporation
*6: homopolypropylene; trade name MA3, manufactured by Japan Polypropylene Corporation
*7: ABS resin; trade name TECHNO ABS110, manufactured by Techno Polymer Co., Ltd.

TABLE 2

| Example | | 8 | 9 | 10 | 11 | 12 | 13 | 14 |
|---|---|---|---|---|---|---|---|---|
| Antistatic agent | (E)-4 | 10 | — | — | — | — | — | — |
| | (E)-5 | — | 10 | — | — | — | — | — |
| | (E)-6 | — | — | 10 | — | — | — | — |
| | (E)-7 | — | — | — | 10 | 10 | 10 | — |
| | (E)-8 | — | — | — | — | — | — | 10 |
| Alkali metal salt | KOAc*1 | — | — | — | — | — | — | — |
| | NaDBS*2 | — | — | — | — | — | — | — |
| | LiOTs*3 | 0.5 | 0.5 | 0.5 | 0.5 | 0.5 | 0.5 | — |
| Ionic liquid | IBTFS*4 | — | — | — | — | — | — | — |
| Thermoplastic resin | ICP*5 | 100 | 100 | 100 | 100 | — | — | 100 |
| | hPP*6 | — | — | — | — | 100 | — | — |
| | ABS*7 | — | — | — | — | — | 100 | — |
| Surface specific resistance ($\Omega/\square$) | After 1 day | $4 \times 10^{11}$ | $7 \times 10^{11}$ | $5 \times 10^{11}$ | $2 \times 10^{11}$ | $7 \times 10^{11}$ | $7 \times 10^{11}$ | $6 \times 10^{12}$ |
| | After 30 days | $3 \times 10^{11}$ | $7 \times 10^{11}$ | $6 \times 10^{11}$ | $2 \times 10^{11}$ | $6 \times 10^{11}$ | $7 \times 10^{11}$ | $5 \times 10^{12}$ |
| | Evaluation of resistance to wiping with water | $4 \times 10^{11}$ | $5 \times 10^{11}$ | $5 \times 10^{11}$ | $2 \times 10^{11}$ | $5 \times 10^{11}$ | $5 \times 10^{11}$ | $5 \times 10^{12}$ |

TABLE 3

| Example | | 15 | 16 | 17 | 18 | 19 | 20 | 21 |
|---|---|---|---|---|---|---|---|---|
| Antistatic agent | (E)-8 | 10 | — | — | — | — | — | — |
| | (E)-9 | — | 10 | — | — | — | — | — |
| | (E)-10 | — | — | 10 | — | — | — | — |
| | (E)-11 | — | — | — | 10 | — | — | — |
| | (E)-12 | — | — | — | — | 10 | — | — |
| | (E)-13 | — | — | — | — | — | 10 | 10 |
| Alkali metal salt | KOAc*1 | — | 0.5 | 0.5 | — | — | — | — |
| | NaDBS*2 | — | — | — | — | — | — | — |
| | LiOTs*3 | 0.5 | — | — | 0.5 | 0.5 | 0.5 | — |
| Ionic liquid | IBTFS*4 | — | — | — | — | — | — | — |
| Thermoplastic resin | ICP*5 | 100 | 100 | 100 | 100 | 100 | 100 | — |
| | hPP*6 | — | — | — | — | — | — | 100 |
| | ABS*7 | — | — | — | — | — | — | — |
| Surface specific resistance ($\Omega/\square$) | After 1 day | $4 \times 10^{11}$ | $8 \times 10^{11}$ | $6 \times 10^{11}$ | $6 \times 10^{11}$ | $1 \times 10^{11}$ | $2 \times 10^{11}$ | $7 \times 10^{12}$ |
| | After 30 days | $3 \times 10^{11}$ | $7 \times 10^{11}$ | $6 \times 10^{11}$ | $6 \times 10^{11}$ | $9 \times 10^{10}$ | $2 \times 10^{11}$ | $6 \times 10^{12}$ |
| | Evaluation of resistance to wiping with water | $2 \times 10^{11}$ | $8 \times 10^{11}$ | $6 \times 10^{11}$ | $5 \times 10^{11}$ | $1 \times 10^{11}$ | $2 \times 10^{11}$ | $7 \times 10^{12}$ |

TABLE 4

| Example | | 22 | 23 | 24 | 25 | 26 | 27 |
|---|---|---|---|---|---|---|---|
| Antistatic agent | (E)-1 | — | — | 7 | 7 | 15 | 15 |
| | (E)-14 | 10 | — | — | — | — | — |
| | (E)-15 | — | 10 | — | — | — | — |
| Alkali metal salt | KOAc*1 | — | — | — | — | — | — |
| | NaDBS*2 | — | — | — | — | — | — |
| | LiOTs*3 | 0.5 | 0.5 | — | 0.5 | — | 0.5 |
| Ionic liquid | IBTFS*4 | — | — | — | — | — | — |
| Thermoplastic resin | ICP*5 | 100 | 100 | 100 | 100 | 100 | 100 |
| | hPP*6 | — | — | — | — | — | — |
| | ABS*7 | — | — | — | — | — | — |
| Surface specific resistance ($\Omega/\square$) | After 1 day | $5 \times 10^{11}$ | $9 \times 10^{11}$ | $9 \times 10^{12}$ | $7 \times 10^{11}$ | $9 \times 10^{11}$ | $8 \times 10^{9}$ |
| | After 30 days | $4 \times 10^{11}$ | $9 \times 10^{11}$ | $9 \times 10^{12}$ | $5 \times 10^{11}$ | $8 \times 10^{11}$ | $8 \times 10^{9}$ |
| | Evaluation of resistance to wiping with water | $4 \times 10^{11}$ | $8 \times 10^{11}$ | $8 \times 10^{12}$ | $6 \times 10^{11}$ | $8 \times 10^{11}$ | $7 \times 10^{9}$ |

TABLE 5

| Comparative Example | | 1 | 2 | 3 | 4 | 5 | 6 | 7 | 8 |
|---|---|---|---|---|---|---|---|---|---|
| Comparative antistatic agent | (1) | 10 | 10 | — | — | — | — | — | — |
| | (2) | — | — | 10 | — | — | — | — | — |
| | (3) | — | — | — | 10 | — | — | — | — |
| | (4) | — | — | — | — | 10 | — | — | — |
| | (5) | — | — | — | — | — | 10 | — | — |
| | (6) | — | — | — | — | — | — | 10 | — |
| | (7)*8 | — | — | — | — | — | — | — | 10 |
| Alkali metal salt | KOAc*1 | — | 0.5 | — | — | — | — | — | — |
| | NaDBS*2 | — | — | — | — | — | — | — | — |
| | LiOTs*3 | — | — | — | — | — | — | — | — |
| Ionic liquid | IBTFS*4 | — | — | — | — | — | — | — | — |
| Thermoplastic resin | ICP*5 | 100 | 100 | 100 | 100 | 100 | 100 | 100 | 100 |
| | hPP*6 | — | — | — | — | — | — | — | — |
| | ABS*7 | — | — | — | — | — | — | — | — |
| Surface specific resistance ($\Omega/\square$) | After 1 day | $5 \times 10^{14}$ | $4 \times 10^{14}$ | $8 \times 10^{14}$ | $1 \times 10^{15}$ | $1 \times 10^{15}$ | $3 \times 10^{15}$ | $1 \times 10^{15}$ | $3 \times 10^{14}$ |
| | After 30 days | $5 \times 10^{14}$ | $2 \times 10^{14}$ | $1 \times 10^{15}$ | $1 \times 10^{15}$ | $8 \times 10^{14}$ | $2 \times 10^{15}$ | $1 \times 10^{15}$ | $3 \times 10^{14}$ |
| | Evaluation of resistance to wiping with water | $4 \times 10^{14}$ | $4 \times 10^{14}$ | $8 \times 10^{14}$ | $1 \times 10^{15}$ | $9 \times 10^{14}$ | $1 \times 10^{15}$ | $1 \times 10^{15}$ | $3 \times 10^{14}$ |

*8polyether ester amide-based antistatic agent; trade name IRGASTAT P-22, manufactured by BASF Japan Ltd.

As shown in Tables above, according to the results of the antistatic resin compositions of Examples, excellent antistatic effect was attained with an addition of a small amount of an antistatic agent or antistatic agent composition, and it was confirmed that the antistatic effect was not reduced with time or by wiping with water.

The invention claimed is:

1. An antistatic agent, comprising a polymer compound (E) having a structure in which a block polymer (C) and an epoxy compound (D) are bound via an ester bond formed by a carboxyl group of said block polymer (C) and an epoxy group of said epoxy compound (D),
    said block polymer (C) having a structure comprising carboxyl groups at both ends, in which structure a block constituted by a polyester (A) having carboxyl groups at both ends and a block constituted by a compound (B) having hydroxyl groups at both ends are repeatedly and alternately bound via ester bonds formed by the carboxyl group and the hydroxyl group, and
    said epoxy compound (D) comprising two or more epoxy groups,
    wherein compound (B) having hydroxyl groups at both ends is a polyethylene glycol,
    said block constituted by said polyester (A) has a number-average molecular weight of 800 to 8,000 in terms of polystyrene,
    said block constituted by said compound (B) having hydroxyl groups at both ends has a number-average molecular weight of 400 to 6,000 in terms of polystyrene, and
    said block polymer (C) has a number-average molecular weight of 5,000 to 25,000 in terms of polystyrene.

2. The antistatic agent according to claim 1, wherein said polymer compound (E) further comprises an ester bond formed by a carboxyl group of said polyester (A) having carboxyl groups at both ends and an epoxy group of said epoxy compound (D).

3. The antistatic agent according to claim 1, wherein said polyester (A) has a structure in which a residue obtained by removing a carboxyl group from an aliphatic dicarboxylic acid and a residue obtained by removing a hydroxyl group from a diol are repeatedly and alternately bound via ester bonds.

4. The antistatic agent according to claim 1, wherein said polyester (A) has a structure represented by Formula (2),

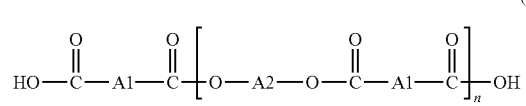

(2)

wherein, A1 represents a residue obtained by removing a carboxyl group from an aliphatic dicarboxylic acid, A2 represents a residue obtained by removing a hydroxyl group from a diol, and n represents a number of 1 to 50.

5. An antistatic agent composition, comprising an antistatic agent and at least one selected from the group consisting of alkali metal salts and Group II element salts, wherein said antistatic agent comprises a polymer compound (E) having a structure in which a block polymer (C) and an epoxy compound (D) are bound via an ester bond formed by a carboxyl group of said block polymer (C) and an epoxy group of said epoxy compound (D),
   said block polymer (C) having a structure comprising carboxyl groups at both ends, in which structure a block constituted by a polyester (A) having carboxyl groups at both ends and a block constituted by a compound (B) having hydroxyl groups at both ends are repeatedly and alternately bound via ester bonds formed by the carboxyl group and the hydroxyl group, and
   said epoxy compound (D) comprising two or more epoxy groups,
   wherein compound (B) having hydroxyl groups at both ends is a polyethylene glycol;
   said block constituted by said polyester (A) has a number-average molecular weight of 800 to 8,000 in terms of polystyrene,
   said block constituted by said compound (B) having hydroxyl groups at both ends has a number-average molecular weight of 400 to 6,000 in terms of polystyrene, and
   said block polymer (C) has a number-average molecular weight of 5,000 to 25.000 in terms of polystyrene.

6. An antistatic resin composition, comprising the antistatic agent composition according to claim 5 in a thermoplastic resin.

7. An antistatic resin composition comprising a thermoplastic resin and an antistatic agent,
   wherein the antistatic agent comprises a polymer compound (E) having a structure in which a block polymer (C) and an epoxy compound (D) are bound via an ester bond formed by a carboxyl group of said block polymer (C) and an epoxy group of said epoxy compound (D),
   said block polymer (C) having a structure comprising carboxyl groups at both ends, in which structure a block constituted by a polyester (A) having carboxyl groups at both ends and a block constituted by a compound (B) having hydroxyl groups at both ends are repeatedly and alternately bound via ester bonds formed by the carboxyl group and the hydroxyl group, and
   said epoxy compound (D) comprising two or more epoxy groups,
   wherein compound (B) having hydroxyl groups at both ends is a polyethylene glycol; and
   wherein said thermoplastic resin is at least one selected from the group consisting of polyolefin-based resins and polystyrene-based resins,
   said block constituted by said polyester (A) has a number-average molecular weight of 800 to 8,000 in terms of polystyrene,
   said block constituted by said compound (B) having hydroxyl groups at both ends has a number-average molecular weight of 400 to 6,000 in terms of polystyrene, and
   said block polymer (C) has a number-average molecular weight of 5,000 to 25.000 in terms of polystyrene.

8. The antistatic resin composition according to claim 7, wherein the mass ratio of said thermoplastic resin and said antistatic agent is in a range of 99/1 to 40/60.

9. The antistatic resin composition according to claim 7, wherein the mass ratio of said thermoplastic resin and said antistatic agent composition is in a range of 99/1 to 40/60.

10. A molded article, characterized by being composed of the antistatic resin composition according to claim 7.

* * * * *

UNITED STATES PATENT AND TRADEMARK OFFICE
CERTIFICATE OF CORRECTION

PATENT NO. : 10,100,239 B2
APPLICATION NO. : 14/760570
DATED : October 16, 2018
INVENTOR(S) : Tatsuhito Nakamura et al.

Page 1 of 1

It is certified that error appears in the above-identified patent and that said Letters Patent is hereby corrected as shown below:

In the Claims

Claim 9, Column 34, Line 32, delete "claim 7," and insert -- claim 6, --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*